United States Patent [19]

Walker et al.

[11] Patent Number: 6,014,439
[45] Date of Patent: Jan. 11, 2000

[54] METHOD AND APPARATUS FOR ENTERTAINING CALLERS IN A QUEUE

[75] Inventors: Jay S. Walker, Ridgefield; James A. Jorasch, Stamford; Thomas M. Sparico, Riverside, all of Conn.

[73] Assignee: Walker Asset Management Limited Partnership, Stamford, Conn.

[21] Appl. No.: 08/826,930

[22] Filed: Apr. 8, 1997

[51] Int. Cl.[7] .................................................. H04M 3/00
[52] U.S. Cl. .......................... 379/266; 379/265; 379/309
[58] Field of Search .................................... 379/265, 266, 379/212, 211, 309

[56] References Cited

U.S. PATENT DOCUMENTS

| | | |
|---|---|---|
| 3,997,718 | 12/1976 | Ricketts et al. . |
| 4,706,275 | 11/1987 | Kamil . |
| 4,788,715 | 11/1988 | Lee . |
| 4,893,330 | 1/1990 | Franco . |
| 4,953,204 | 8/1990 | Cuschleg et al. ..................... 379/266 |
| 4,975,942 | 12/1990 | Zebryk . |
| 5,003,584 | 3/1991 | Benyacar et al. . |
| 5,020,095 | 5/1991 | Morganstein et al. ............. 379/266 X |
| 5,058,152 | 10/1991 | Solomon et al. . |
| 5,146,491 | 9/1992 | Silver et al. . |
| 5,148,474 | 9/1992 | Haralambopoulos et al. . |
| 5,148,494 | 9/1992 | Haralambopoulos et al. . |
| 5,163,086 | 11/1992 | Ahearn et al. . |
| 5,166,979 | 11/1992 | Morganstein et al. . |
| 5,204,894 | 4/1993 | Darden . |
| 5,222,121 | 6/1993 | Shimada . |
| 5,249,219 | 9/1993 | Morganstein et al. . |
| 5,287,403 | 2/1994 | Atkins et al. . |
| 5,353,335 | 10/1994 | D'Urso . |
| 5,359,642 | 10/1994 | Castro . |
| 5,420,926 | 5/1995 | Low et al. . |
| 5,444,774 | 8/1995 | Friedes . |
| 5,469,497 | 11/1995 | Pierce et al. . |
| 5,483,588 | 1/1996 | Eaton et al. . |
| 5,485,510 | 1/1996 | Colbert . |
| 5,488,411 | 1/1996 | Lewis . |
| 5,511,112 | 4/1996 | Szlam . |
| 5,513,117 | 4/1996 | Small . |

(List continued on next page.)

FOREIGN PATENT DOCUMENTS

WO 98/10558  3/1998  WIPO .

OTHER PUBLICATIONS

"Audio Com (North Miami, Florida) is Working to Turn Telephone 'Hold' Time Into a Prime Promotional Opportunity", Advertsing Age, Dec. 20, 1982 at p. 24MW1.

"Callers Don't Mind Hearing Helpful Ads When on Hold", Telecommunication Alert, Dec. 1990, vol. 8, No. 12.

T. C. Doyle, "WordPerfect's Mix: Deejays Offer Users Toll–Free Easy Listening", Computer Reseller News, Jan. 6, 1992, at p. 114.

"Acquisition: US West Marketing Resources Acquires Please Hold Promotions", Edge, Mar. 7, 1994 at p. 25.

Shari Valenz, "Going Past The Tip Of The Iceberg: Unified Messaging and Multimedia Apps are Voice Mail's Future", Teleconnect, Apr., 1994 at p. 66.

(List continued on next page.)

Primary Examiner—Creighton Smith
Attorney, Agent, or Firm—Dean Alderucci; Patrick J. Buckley

[57] ABSTRACT

A system for entertaining a caller placed in a queue of a call center is disclosed that allows the caller to access a plurality of entertainment options while on hold. The entertainment options permit the caller to (i) place a call to a third party while on hold; or (ii) access one or more premium entertainment services while on hold. A PBX/ACD receives the calls destined for the call center, and queues the calls when an appropriate attendant is not available. An IVRU prompts a caller for specific information and forwards the collected information to the PBX/ACD. The IVRU provides the caller with a menu of available entertainment options which can be accessed by the caller while the caller is on hold. The PBX/ACD establishes a connection between the caller and the selected entertainment service. The call is then transferred to an available attendant with any data that may be required to process the call.

47 Claims, 10 Drawing Sheets

U.S. PATENT DOCUMENTS

| | | |
|---|---|---|
| 5,515,421 | 5/1996 | Sikand et al. . |
| 5,521,631 | 5/1996 | Budow et al. . |
| 5,528,670 | 6/1996 | Elliot et al. . |
| 5,537,464 | 7/1996 | Lewis et al. . |
| 5,546,446 | 8/1996 | Tsunokawa et al. . |
| 5,559,871 | 9/1996 | Smith . |
| 5,561,707 | 10/1996 | Katz . |
| 5,565,908 | 10/1996 | Ahmad . |
| 5,577,109 | 11/1996 | Stimson et al. . |
| 5,581,270 | 12/1996 | Smith et al. . |
| 5,592,537 | 1/1997 | Moen . |
| 5,603,078 | 2/1997 | Henderson et al. . |
| 5,608,785 | 3/1997 | Kasday . |
| 5,621,787 | 4/1997 | McKoy et al. . |
| 5,638,426 | 6/1997 | Lewis . |
| 5,651,058 | 7/1997 | Hackett-Jones et al. . |
| 5,715,298 | 2/1998 | Rogers . |
| 5,729,279 | 3/1998 | Fuller . |
| 5,749,075 | 5/1998 | Toader et al. . |
| 5,767,894 | 6/1998 | Fuller et al. . |
| 5,784,565 | 7/1998 | Lewine . |
| 5,818,512 | 10/1998 | Fuller . |
| 5,818,836 | 10/1998 | DuVal . |
| 5,825,863 | 10/1998 | Walker . |
| 5,835,126 | 11/1998 | Lewis . |
| 5,867,566 | 2/1999 | Hogan et al. . |
| 5,872,834 | 2/1999 | Teitelbaum . |
| 5,884,284 | 3/1999 | Peters et al. . |

OTHER PUBLICATIONS

Terry Higgins, "Since We're Always on Hold, We Might As Well Dance To It", Business Journal–Milwaukee, Apr. 9, 1994 at p5A.

Charles E. Day, "New Technologies That Facilitate Integrated Inbound/Outbound Marketing", Telemarketing, May 1994 at p. 75.

Charles E. Day, "Call–Blending Technology That Suits Your Needs: Predictive Dialer Manufacturer's Perspective", Telemarketing, Jan. 1995 at p. 56.

John Manrique, "Focus On: Options For On–hold Messaging Equipment", Telemarketing, Mar. 1995 at p. 53.

Alison Ousey, "Voice Mail: New Directions", Teleconnect, Apr. 1995 at p. 63.

Focus on What to Expect From an On–hold Message Service Provider, Telemarketing Aug. 1995 at p. 38.

"U.S. Call Center Hardware And Software Markets", Frost & Sullivan, Feb. 1996.

Joe KIdd, "Oregon's Symantec Hires Telephone 'QJS' To Entertain Callers", Register–Guard, Feb. 22, 1996.

Lyle Deixler, "Teledata's Call Link for Windows", Teleconnect, Mar. 1996 at p. 44.

Susan Bard Hall, "Hotels Dialing Up 'On Hold' Promos", Hotel & Motel Management, Mar. 18, 1996 at p. 10.

J. Anderson, "Microsoft Return of the Arcade", Computer Gaming World, May 1996 at p. 54.

Alison Ousey, "On–hold Messaging" Teleconnect, Sep. 1996 at p. 54.

Liz Pulliam, "Money 101: College Students May Learn The Hardest Accounting Lessions Outside The Classroom", The Orange County Register, Sep. 1, 1996 ay p. K01.

"Kid's Phone Usage Another Way For Marketing To Get Connected", Selling To Kids, Jan. 22, 1997.

"College Talk", (http://www.adforce.com/videc/ctalk.htm), download date: May 21, 1997.

Pulliam, Liz, "College Students May Learn the Hardest Accounting Lessons Outside the Classroom," The Orange County Register, Business section, p. K101, Sept. 1, 1996.

"College Talk: A Travel Card and 800 Number Rolled Into One," (http://www.adforce.com/videc/ctalk.htm), Download date: May 21, 1997.

"U S West, Qwest Create Phone Alliance," The Arkansas Democrat–Gazette, New section, p. D2, May 11, 1998.

| CUSTOMER NAME 320 | ADDRESS 325 | TELEPHONE NUMBER (ANI) 330 | CUSTOMER DATA 335 | PAID ENTERTAINMENT OPTION ACCESS FLAG 340 |
|---|---|---|---|---|
| JOHN SMITH | 123 MAIN ST. | (203) 555-1212 | REGULAR PURCHASER | NO ACCESS - PRIOR FRAUDULENT USAGE |
| FRANK JONES | 245 TOWER RD. | (415) 555-1212 | INFREQUENT PURCHASER | NO COMPLIMENTARY ACCESS |
| MARY PARKER | 513 STATE ST. | (212) 555-1212 | FREQUENT PURCHASER | PROVIDE ACCESS |

FIG. 3

| CALL TRACKING NUMBER 420 | CALL SUBJECT CATEGORY 425 | CALL POSITION 430 | CALL PHONE NUMBER (ANI) 435 | CHANNEL NUMBER 440 | TIME CALL WAS RECEIVED 445 | ATTENDANT IDENTIFICATION NUMBER 450 |
|---|---|---|---|---|---|---|
| TS1458 | PRINTER PROBLEM | 005 | (203) 555-1212 | 14 | 10:05 PM | BV2069 |
| JJ9724 | SYSTEM ERROR | 016 | (415) 555-1212 | 07 | 11:12 PM | JR6801 |
| SJ0691 | SOFTWARE INSTALLATION | 025 | (212) 555-1212 | 26 | 9:38 AM | TM9724 |

FIG. 4

| ATTENDANT IDENTIFICATION NUMBER 520 | ATTENDANT STATUS 525 | AREA OF EXPERTISE 530 |
| --- | --- | --- |
| BV2069 | BUSY | PRINTERS |
| JR6081 | BUSY | MODEMS |
| TM9724 | AVAILABLE | MONITORS |

FIG. 5

| PREMIUM ENTERTAINMENT SERVICE 620 | CONTENT PROVIDER 625 | ACCESS INFORMATION 630 | ACCOUNT NUMBER 635 | PASSWORD 640 | COST 645 |
|---|---|---|---|---|---|
| INTERNET | WEB SPORTS, INC. | HTTP://WWW.SPORTS.COM | 85069 | APACHE | $10/MONTH |
| 900 NUMBER | WEATHER SERVICE | 1-900-555-1212 | 98761 | SESAME | $2/MINUTE |
| PAY-PER-VIEW | CABLE BOXING EVENTS | CHANNEL 15 | 12345 | ROCK | $1/MINUTE |

FIG. 6

| CONNECTION ID NUMBER 720 | CALLER TELEPHONE NUMBER 725 | DATE 730 | TIME 735 | CONNECTION DURATION 740 | CONTENT PROVIDER 745 | COST 750 |
|---|---|---|---|---|---|---|
| 469F | (203) 555-1212 | 5/7/97 | 10:10 PM | 15 MINUTES | WEB SPORTS, INC. | $1 |
| 243J | (203) 555-1212 | 6/3/97 | 11:13 PM | 3 MINUTES | CABLE BOXING EVENTS | $3 |
| 682X | (203) 555-1212 | 6/5/97 | 9:45 AM | 16 MINUTES | WEB SPORTS, INC. | $1 |

FIG. 7

METHOD AND APPARATUS FOR ENTERTAINING CALLERS IN A QUEUE

FIELD OF THE INVENTION

The present invention relates generally to a system for entertaining callers waiting in a queue and more particularly, to a system for offering such callers a plurality of entertainment options, such as the option to make a third party telephone call.

BACKGROUND OF THE INVENTION

Telephone-based customer service plays an increasingly important role for organizations involved in activities requiring direct communication with customers. In order to serve a maximum number of callers, call centers are typically designed to optimize call handling efficiency and telephone attendant productivity. Many conventional systems allow telephone attendants to service a greater number of callers by ascertaining the nature of a caller's request through collection, by a live attendant, of initial information from the caller, and transferring the call to a voice response unit to address the specific request of the caller. Other systems reverse the answer and collection process by connecting the caller initially to a voice response unit which collects information on the nature of a caller's request, which is ultimately used to route the call to an appropriate attendant.

An Automatic Call Distributor (ACD) is commonly utilized by call centers to enhance attendant productivity. An ACD allows a call center to cost-effectively handle a large number of calls by placing some of the calls in a holding queue when no attendants are available. When a call is placed in the holding queue, a greeting message identifying the called party is typically played to the caller, indicating that the next available attendant will service the call.

Call queuing plays an important role in call center operations and provides many advantages to the call center, including increased attendant productivity, by minimizing idle time for the attendant, simultaneous handling of a greater number of calls during an increase in calls, and encouragement of callers to wait for an available attendant, as opposed to requiring the caller to attempt another call in response to a busy signal. Call queuing, however, is perceived by customers to be a waste of their time, and may result in frustration, abandoned calls, a loss of business, and poor customer satisfaction when the holding time is deemed excessive.

Thus, in order to entertain callers waiting in a call queue, many call centers play music, news, weather or advertising messages to the caller during the holding period. In this manner, the caller may be entertained or informed of sales promotions for particular products or services. For example, U.S. Pat. No. 5,444,774 to Friedes discloses an Interactive Queuing System For Call Centers and suggests that music or advertising messages may be played to a caller on hold.

Unfortunately, such conventional call queuing entertainment systems have experienced only marginal success in satisfying callers placed in a holding queue. Since most callers can already access such conventional and freely available programming sources directly from their home, such programming is generally not a sufficient novelty or value to the caller, nor does it allow the caller to make effective use of the holding time, and it generally does not minimize the frustration experienced by the caller as a result of an excessive hold time.

Although it would be desirable for call centers to provide callers with a plurality of entertainment options, conventional systems for entertaining callers placed on hold by a call center do not permit a caller to select a desired entertainment option. If a call center could provide a caller with a number of valuable entertainment options while on hold, caller satisfaction and tolerance of excessive hold times would increase. In addition, the improved entertainment system could be advantageously marketed by the call center as an added customer service benefit.

As apparent from the above deficiencies with conventional systems for entertaining callers placed on hold by a call center, a need exists for an entertainment system that allows callers to receive a valuable entertainment option while on hold, such as the option to place a call to a third party, or access premium entertainment services such as shared-revenue telephone services. If a caller accesses the call center using a video phone, a further need exists for an entertainment system that allows the caller to access premium entertainment services which include video content, such as pay-per-view services. If the caller is connected to a support provider via the Internet, a need exists for a system which provides premium web content while on hold.

SUMMARY OF THE INVENTION

Generally, according to one aspect of the invention, a caller placed in a queue of a call center will be permitted to access an entertainment option while on hold. The entertainment options permits the caller to (i) place a free or subsidized call to a third party; or (ii) access one or more premium entertainment services. A premium entertainment service is a service for which a fee is charged for the use of that service. According to a further aspect of the invention, access to the entertainment options can be provided to a caller on a complimentary basis, or for an additional payment which may be less than the typical cost of such a service.

A call handling process is disclosed which incorporates features of the invention to allow the call center to (i) route a call to an appropriate attendant console within a pool of attendants, (ii) transfer calls to an interactive voice response unit (IVRU) when no attendants are available to service calls, (iii) place a call in a holding queue, if needed, and (iv) provide a caller on hold with access to the entertainment options.

A caller at a station set, such as a conventional telephone, video phone or personal computer configured with appropriate telephony software and Internet connectivity, places a call to the call center. The call is routed via the public telephone network to the call center in a conventional manner. The call is preferably processed within the call center to a Private Branch Exchange switch (PBX) with Automatic Call Distribution (ACD) capability. The PBX/ACD is preferably connected to an interactive voice response unit (IVRU).

The PBX/ACD is a switching system designed to receive calls destined for the call center, and queue the calls when an appropriate attendant is not available. In addition, the PBX/ACD distributes calls to attendants to ensure even call handling loads among attendants, in a known manner. The ACD functionality can be integrated with the PBX, or provided by a separate unit.

The IVRU is a voice information system arranged to prompt a caller for specific information and forward the collected information to the PBX/ACD. In addition, the IVRU preferably provides a greeting to the caller identifying the called party, announces that the call will be handled by the next available attendant and provides the caller with an estimate of the holding period.

According to one aspect of the invention, the IVRU provides the caller with a menu of available entertainment options which can be accessed by the caller while the caller is on hold. Preferably, the available entertainment options permit the caller (i) to place a free or subsidized call to a third party while on hold; or (ii) to access premium entertainment services while on hold.

Upon receipt of the caller's selection, the PBX/ACD establishes a connection to the selected entertainment option. If the caller has selected to place a call to a third party while on hold, the caller is preferably prompted by the IVRU to enter the telephone number of the third party to be called. If the caller has selected a particular premium entertainment service, the PBX/ACD accesses a content database to retrieve information required to access the selected content provider. A connection is thereafter established by the PBX/ACD between the caller and the selected entertainment option.

Once the connection is established, the caller is presented with the selected entertainment service while on hold. The PBX/ACD monitors the queue and determines when the call is ready to be handled by the next available attendant. Once an attendant is available to handle the call, a disconnect warning is preferably played to the caller, and the caller can choose when to have the call transferred to the appropriate attendant console along with any data that may be required by the attendant to process the call, in a known manner.

Once the connection to the selected entertainment service is terminated, an entry of the entertainment connection session is preferably made in a connection record database. The call center is preferably billed by each content or service provider for the total connection time. The billing information can be verified using the connection record database.

A more complete understanding of the present invention, as well as further features and advantages of the present invention, will be obtained by reference to the following detailed description and drawings.

BRIEF DESCRIPTION OF DRAWINGS

FIG. 3 illustrates a sample table from the customer account database of FIG. 2;

FIG. 4 illustrates a sample table from the call database of FIG. 2;

FIG. 5 illustrates a sample table from the attendant database of FIG. 2;

FIG. 6 illustrates a sample table from the content database of FIG. 2;

FIG. 7 illustrates a sample table from the connection record database of FIG. 2.

DETAILED DESCRIPTION

Figure 1:
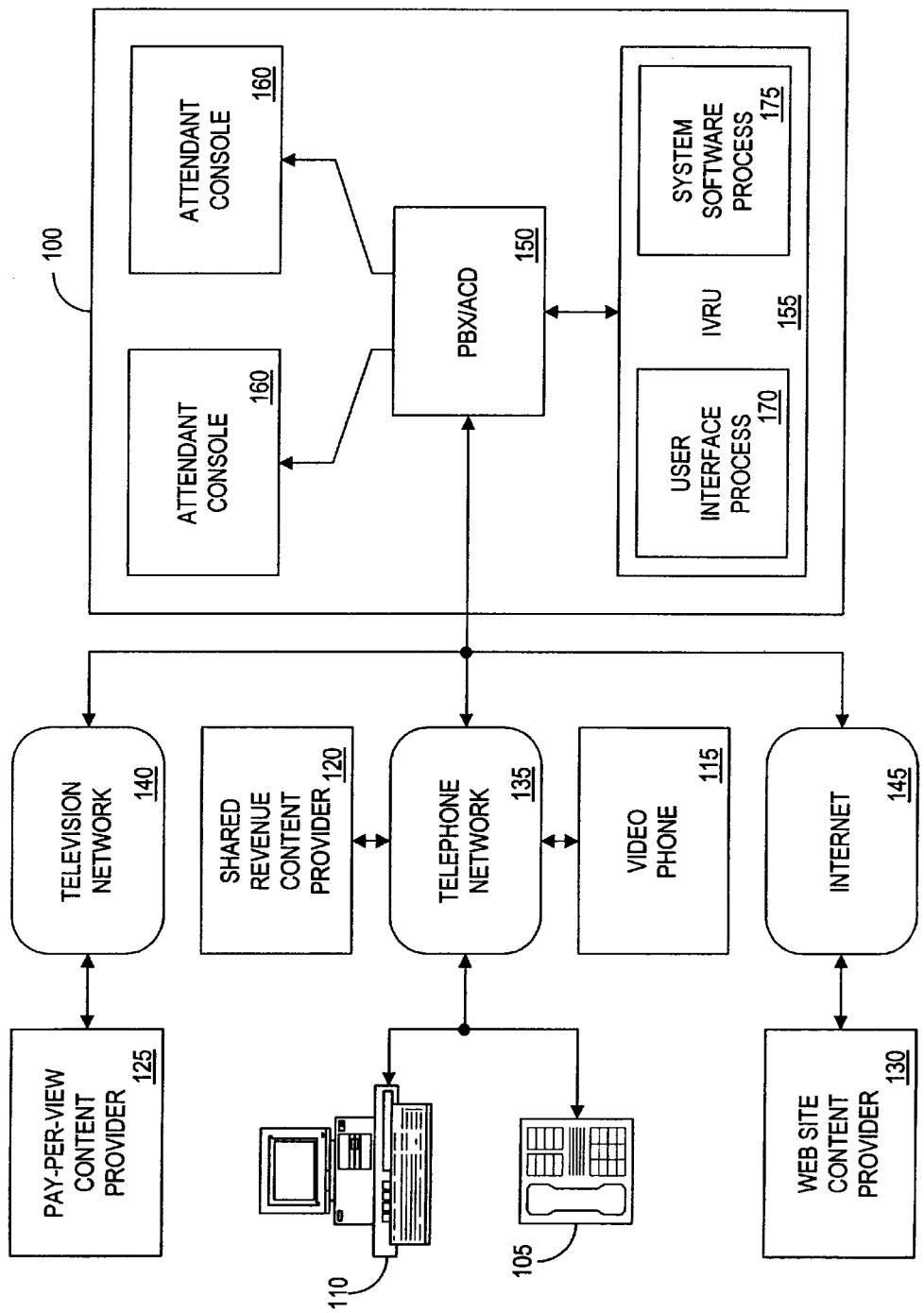
FIG. 1 is a schematic block diagram of a communication switching system in accordance with one embodiment of the present invention.

FIG. 1 shows an illustrative network environment for transferring multimedia information, such as video, audio and data, between one or more callers at station sets 105, 110, 115, who are waiting in a queue of a call center 100, and one or more content providers, such as content providers 120, 125, 130, over one or more external networks 135, 140, 145. According to a feature of the present invention, the call center 100 enables a caller placed in a queue to access an entertainment option while on hold. As used herein, the entertainment options permits the caller to (i) place a free or subsidized call to a third party while on hold; or (ii) to access one or more premium entertainment services provided by the content providers, such as content providers 120, 125, 130, while on hold.

A premium entertainment service, as used herein, is a service for which a fee is specifically charged for the use of that service, including shared-revenue telephone services such as 900 or 976 services, premium web sites, and pay-per-view services. It is noted that the fee incurred for a particular premium entertainment service may be a variable rate based on the amount of usage of the premium entertainment service (for example, a per-minute rate) or a fixed fee for a predefined period of time (for example, a flat monthly fee). According to a further feature of the invention, access to the entertainment options can be provided to a caller on a complimentary basis or for an additional payment.

As shown in FIG. 1, a caller at a station set, such as station set 105, places a call to the call center 100. The station set 105 may be embodied as a conventional telephone, video phone or personal computer configured with appropriate telephony software and Internet connectivity. The call is routed via the telephone network 135, discussed below, to the call center 100, in a conventional manner. The call is preferably routed within the call center 100 to a Private Branch Exchange switch (PBX) with Automatic Call Distribution (ACD) capability. The PBX/ACD 150 is preferably connected to an interactive voice response unit (IVRU) 155. As discussed further below, the PBX/ACD 150 and the IVRU 155 may comprise conventional hardware and software, as modified herein to carry out the functions and operations of the present invention.

The PBX/ACD 150 may be embodied, for example, using the AT&T Definity PBX with Automatic Call Distribution (ACD) capability, as modified herein to execute the functions and operations of the present invention. The PBX/ACD 150 is discussed more fully below in conjunction with FIG. 2. Generally, the PBX/ACD 150 is a switching system designed to receive calls destined for call center 100, and queue them when an appropriate attendant is not available. In addition, the PBX/ACD 150 distributes calls to attendants or specific groups of attendants according to a prearranged scheme, such as a hunt group, to ensure even call handling loads among attendants, in a known manner. The ACD functionality can be integrated with the PBX, as in the illustrative embodiment shown in FIG. 1, or provided by a separate unit.

The IVRU 155 is a voice information system arranged to (i) prompt a caller for specific information by asking questions based on a set of modules in a transaction script, (ii) collect that information by detecting and interpreting dual tone multifrequency (DTMF) signals entered by the caller or by recognizing speech input from the caller, (iii) organize the collected information in a specific format and (iv) forward the collected information to the PBX/ACD 150. The IVRU 155 may be embodied, for example, using the AT&T Conversant Voice System. For a detailed description of the AT&T Conversant Voice System, see AT&T Technical Journal, Vol. 65, Issue 5, pp. 34–47, September/October 1986, incorporated herein by reference.

Generally, the IVRU 155 includes a central processing unit (CPU) (not shown) which executes a user-interface process 170 and a system software process 175. The user-interface process 170 includes a transaction script including a sequence of questions to be posed to a caller to elicit answers in the form of DTMF signals or speech input. The modules of a transaction script are executed in a specified order (which may vary based on the caller's responses) to answer incoming calls destined for call center 100 and to greet callers with pre-recorded voice prompts to direct callers to enter specific information to process their calls. The system software process 175, on the other hand, includes primitives to detect DTMF signals entered by the caller and speech recognition software to identify speech input provided by a caller.

The PBX/ACD 150 and the IVRU 155 preferably transmit digitally encoded data and other information, including voice signals, between one another. The transmitted data and other information may represent caller name and identification number, specific information entered by the caller in response to the sequence of posed questions, and a menu of entertainment options and caller selections. The communications link between the PBX/ACD 150 and the IVRU 155 preferably comprises a cable or wireless link on which electronic signals can propagate.

Once an attendant is available, the IVRU 155 preferably plays a short message to the caller indicating that the call is being connected to a live attendant and transfers the call along with the collected data to the PBX/ACD 150. The collected information is thereafter forwarded by the PBX/ACD 150 to an available attendant console 160 for display to the attendant who handles the call. Each attendant console 160 preferably includes a station set and an associated console or general purpose computer to enter or receive data required to complete a transaction with a caller.

It is noted that each content provider, such as content providers 120, 125, 130, preferably employs a general purpose computer for communicating with the call center 100. The general purpose computer of each content provider 120, 125, 130 is preferably comprised of a processing unit, a modem, memory means and any required audio/video hardware and software.

The telephone network 135, as used herein, includes the combination of local and long distance wire or wireless facilities and switches known as the public switched telephone network ("PSTN"), as well as cellular network systems and the telephony feature of the Internet. The telephone network 135 is utilized to complete calls between (i) a caller at a station set, such as station sets 105, 110, 115, and the call center 100; (ii) a caller on hold and a third party; and (iii) a caller on hold and a shared-revenue telephone service, such as a 900 or 976 service, provided by content provider 120. As is well known, shared-revenue telephone services deliver a particular service over the telephone and subsequently bill the caller. The caller is typically identified by the telephone number (ANI) from which the call is made, with the subsequent bill then included as part of the caller's regular telephone bill. The content provider typically calculates the amount of the bill after the service has been delivered. This amount is forwarded to the billing telephone company, which both bills and collects the appropriate amount from the caller. The telephone company typically deducts a portion of the total fee for the service in return for both the cost of making the telephone connection and for the telephone company's role as bill collector.

The television network 140, as used herein, includes a wireless broadcast network for distribution of premium video programming, such as Digital Satellite Service ("DSS"), as well as a conventional wired cable television network ("CATV"). The premium entertainment services accessed via the television network 140 include pay-per-view video programming.

The Internet network 145, as used herein, includes the World Wide Web (the "Web") and other systems for storing and retrieving information using the Internet. To view a web site, the user communicates an electronic Web address, referred to as a Uniform Resource Locator ("URL"), associated with the web site. In one preferred embodiment, the caller can be presented with a list or menu of available premium web sites by the IVRU 155, with the corresponding URL programmed for each web site. The caller thereafter enters his selection of a desired premium web site, which selection is transmitted to the PBX/ACD 150. A web browser software product, such as Netscape Navigator or Microsoft Internet Explorer, then accesses the web site by communicating with the appropriate server, in a known manner. The premium entertainment services accessed via the Internet network 145 include premium web sites, such as ESPNET Sportszone. It is noted that if the caller accesses the call center 100 from a conventional telephone, the textual portions of a premium web site may be converted to speech for presentation to the caller.

Figure 2:
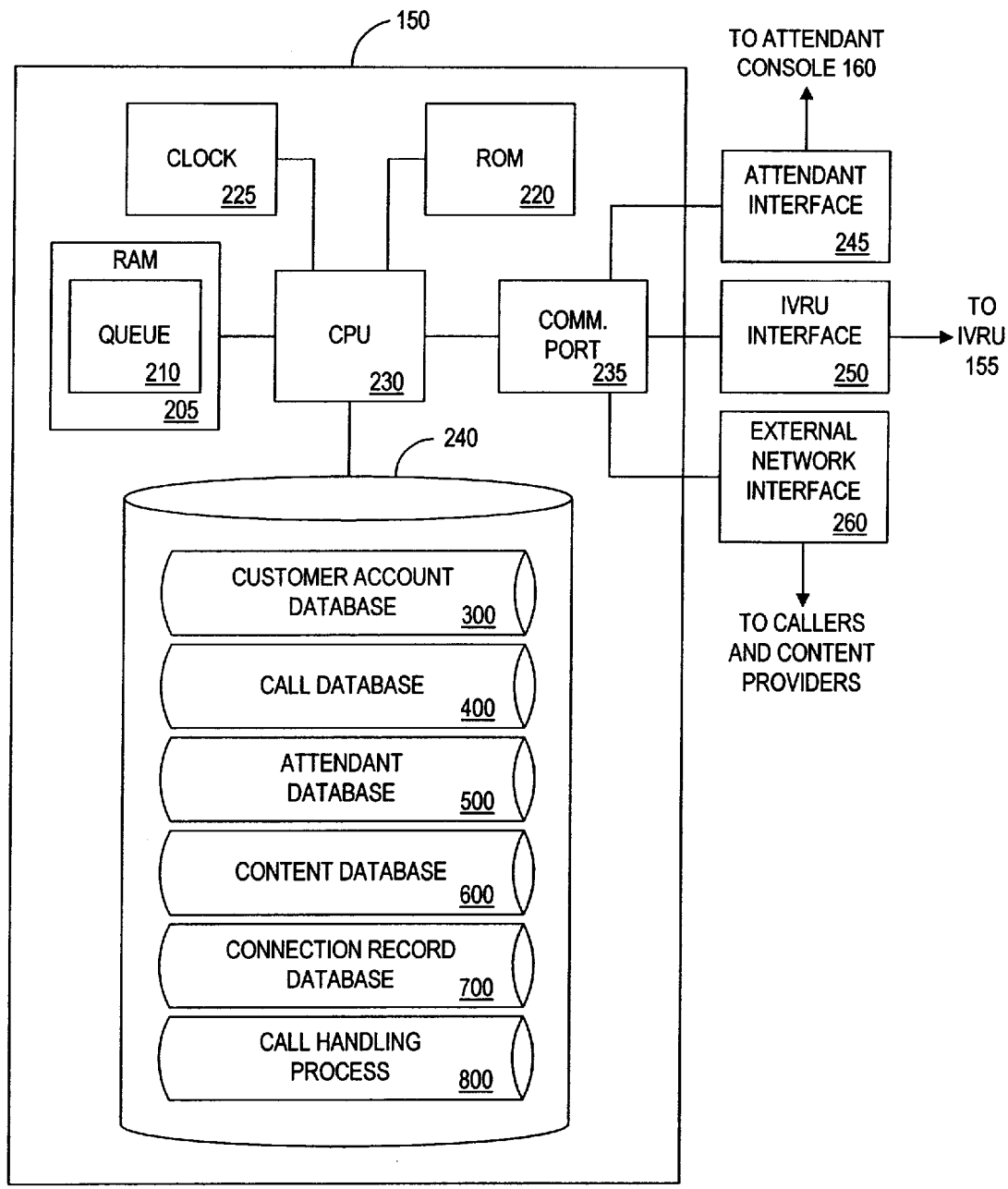
FIG. 2 is a schematic block diagram of the PBX/ACD of FIG. 1.

FIG. 2 is a block diagram showing the architecture of an illustrative PBX/ACD 150. As previously indicated, the PBX/ACD 150 may be embodied, for example, using the AT&T Definity PBX with Automatic Call Distribution (ACD) capability, as modified herein to execute the functions and operations of the present invention. The PBX/ACD 150 preferably includes certain standard hardware components, such as a central processing unit (CPU) 230, a data storage device 240, a read only memory (ROM) 220, a random access memory (RAM) 205, a clock 225, and a communications port 235. The CPU 230 is preferably linked to each of the other listed elements, either by means of a shared data bus, or dedicated connections, as shown in FIG. 2.

The CPU 230 may be embodied as a single processor, or a number of processors operating in parallel. The data storage device 240 and/or ROM 220 are operable to store one or more instructions, as discussed below in conjunction with FIGS. 8a through 8c, which the CPU 230 is operable to retrieve, interpret and execute. The RAM 205 preferably stores the queue 210 of indicators describing the order of the queued calls directed to the call center. The CPU 230 preferably includes a control unit, an arithmetic logic unit (ALU), and a CPU local memory storage device, such as, for example, a stackable cache or a plurality of registers, in a known manner. The control unit is operable to retrieve instructions from the data storage device 240 or ROM 220. The ALU is operable to perform a plurality of operations needed to carry out instructions. The CPU local memory storage device is operable to provide high speed storage used for storing temporary results and control information.

As discussed further below in conjunction with FIGS. 3 through 7, the data storage device 240 includes a customer account database 300, a call database 400, an attendant database 500, a content database 600, and a connection record database 700. The customer account database 300 preferably stores information on each customer, such as biographical information and purchase history information. The call database 400 preferably stores information on each call being processed by the call center 100, including an indication of the position of the call within the queue 210. The attendant database 500 preferably stores information on each attendant, including an indication of the availability status of each attendant and his respective expertise.

The content database 600 preferably stores information required by the PBX/ACD 150 for each available premium entertainment service, including information required to access the selected content provider, such as the appropriate external network and network address to be utilized, as well as any required account number and/or password. The connection record database 700 preferably stores information on each connection session made by the PBX/ACD 150 to an entertainment service, including an indication of the duration or estimated cost of each connection session.

In addition, the data storage device 240 includes a call handling process 800, discussed further below in conjunction with FIGS. 8a through 8c. Generally, the call handling process 800 allows the PBX/ACD 150 to (i) route a call to an appropriate attendant console 160 within a pool of attendants, (ii) transfer calls to the IVRU 155 when no attendants are available to service a particular call, (iii) place a call in a holding queue, if needed, and (iv) provide a caller on hold with access to the entertainment options.

According to a feature of the present invention, if the caller elects to place a call to a third party while on hold, the caller is preferably prompted by the call handling process 800 to enter the telephone number of the third party to be called. If the caller selects a particular premium entertainment service, the PBX/ACD 150 accesses the content database 600 to retrieve any information required to access the selected content provider. A connection is thereafter established by the PBX/ACD 150 between the caller and the selected entertainment option for the duration of the holding period.

The communications port 235 connects the PBX/ACD 150 to an attendant interface 245, an IVRU interface 250 and an external network interface 260, thereby linking the PBX/ACD 150 to each attendant console 160, the IVRU 155 and the external networks 135, 140, 145, respectively. The communications port 235 preferably includes multiple communication channels for simultaneously establishing a plurality of connections.

According to a feature of the present invention, the PBX/ACD 150 is capable of presenting entertainment options, including premium entertainment services received from one or more content providers 120, 125, 130, to a caller in a queue of the call center 100. As previously indicated, the premium entertainment services received from the content provider may be multimedia information, including video, audio and/or data information. Thus, the PBX/ACD 150 is preferably capable of transmitting such multimedia information to a caller. It is noted that a caller must access the call center 100 using a video phone station set 115 or a personal computer station set 110 in order to view any video content that may be provided by premium entertainment service providers.

As previously indicated, the customer account database 300, shown in FIG. 3, preferably stores information on each customer, including biographical information and purchase history information. The customer account database 300 maintains a plurality of records, such as records 310–312, each associated with a different customer. For each customer name listed in field 320, the customer account database 300 includes the customer's address in field 325 and telephone number in field 330. In addition, the customer account database 300 preferably includes customer data in field 335. For example, the customer data may indicate any purchases or reservations made by the customer, relevant customer history or other information which may be required by the call center 100 to process a call from the given customer.

In one preferred embodiment, the customer account database 300 includes a flag in field 340 indicating whether the respective customer should be provided with access to the paid entertainment options during any holding periods. In this manner, the call center 100 can limit complimentary access to certain classes of customers, such as frequent purchasers, and deny access to customers who have previously made fraudulent usage of the complimentary paid entertainment options. In other words, customers who make a practice of calling the call center 100 to access the complimentary paid entertainment options during the holding period and then hang up when an attendant becomes available should thereafter be denied complimentary access to the paid entertainment options.

As previously indicated, the call database 400, shown in FIG. 4, preferably stores information on each call being processed by the call center 100, including an indication of the position of the call within the queue. The call database 400 maintains a plurality of records, such as records 411–413, each associated with a different call being processed by the call center 100. For each call listed by the tracking number assigned by the call center 100 in field 420, the call database 400 preferably includes an indication of the subject category associated with the call in field 425, based on initial information collected by the IVRU 155, an indication of the position of the call within the queue in field 430 and the telephone number (ANI) of the station set 105, 110, 115 which placed the call in field 435. In addition, the call database 400 identifies the channel number associated with the call in field 440, the time the call was received in field 445 and the identification number of the attendant handling the call (once assigned) in field 450.

As discussed above, the attendant database 500, shown in FIG. 5, preferably stores information on each attendant utilized by the call center 100. The attendant database 500 maintains a plurality of records, such as records 511–513, each associated with a different attendant handling customer calls. For each attendant listed by identification number in field 520, the attendant database 500 includes the current availability status of the attendant in field 525 and an indication of any expertise of the attendant in field 530. Field 525 can also be utilized to identify any attendants who speak a particular foreign language.

Information required by the PBX/ACD 150 on each available premium entertainment service is preferably stored in a content database, such as the content database 600 illustrated in FIG. 6. The content database 600 maintains a plurality of records, such as records 610–612, each associated with a different premium entertainment service. For each premium entertainment service option listed in field 620, the content database 600 includes an indication in field 625 of the appropriate content provider, such as the content provider 125, that provides the respective premium entertainment service. In addition, the content database 600 preferably contains any information which is required to access each premium entertainment service. In one embodiment, the content database 600 stores access information in field 630, an account number in field 635 and a password in field 640.

For example, if a particular premium entertainment service is a premium web site, the access information stored in field 630 may indicate that the web site is accessed via the Internet 145, and may contain the appropriate URL address. Similarly, if a premium entertainment service is a shared-revenue telephone service, the access information stored in field 630 may indicate that the shared revenue telephone service is accessed via the telephone network 135, and contain the appropriate 900 or 976 telephone number. Finally, if the premium entertainment service is a pay-per-view movie clip selection, the access information may indicate that the pay-per-view movie clip is accessed via a cable (or wireless) television network, such as the network 140, and contain the appropriate cable television channel number.

In one embodiment, the content database 600 also includes cost information in field 645 for each premium entertainment service. In this manner, the call center 100 can maintain estimated cost information for each connection session and implement variable per minute rates for one or more premium entertainment services.

As previously indicated, the PBX/ACD 150 preferably maintains a connection record database 700, shown in FIG. 7, for storing information on each connection session to an entertainment service. The connection record database 700 maintains a plurality of records, such as the records 710–712, each associated with a different connection session made by the PBX/ACD 150 to an entertainment service. For each connection session listed by an assigned identification number in field 720, the connection record database 700 preferably stores the telephone number of the customer who requested the connection in field 725, and the date, time and duration of the connection in fields 730, 735 and 740, respectively. In addition, the connection record database 700 preferably records an indication of the provider, such as the content provider 125, in field 745 that provides the entertainment option associated with the connection and an indication of the estimated cost of the connection in field 750. In this manner, the call center 100 has recorded the appropriate information which may be required to verify any contested charges.

Figure 8A:
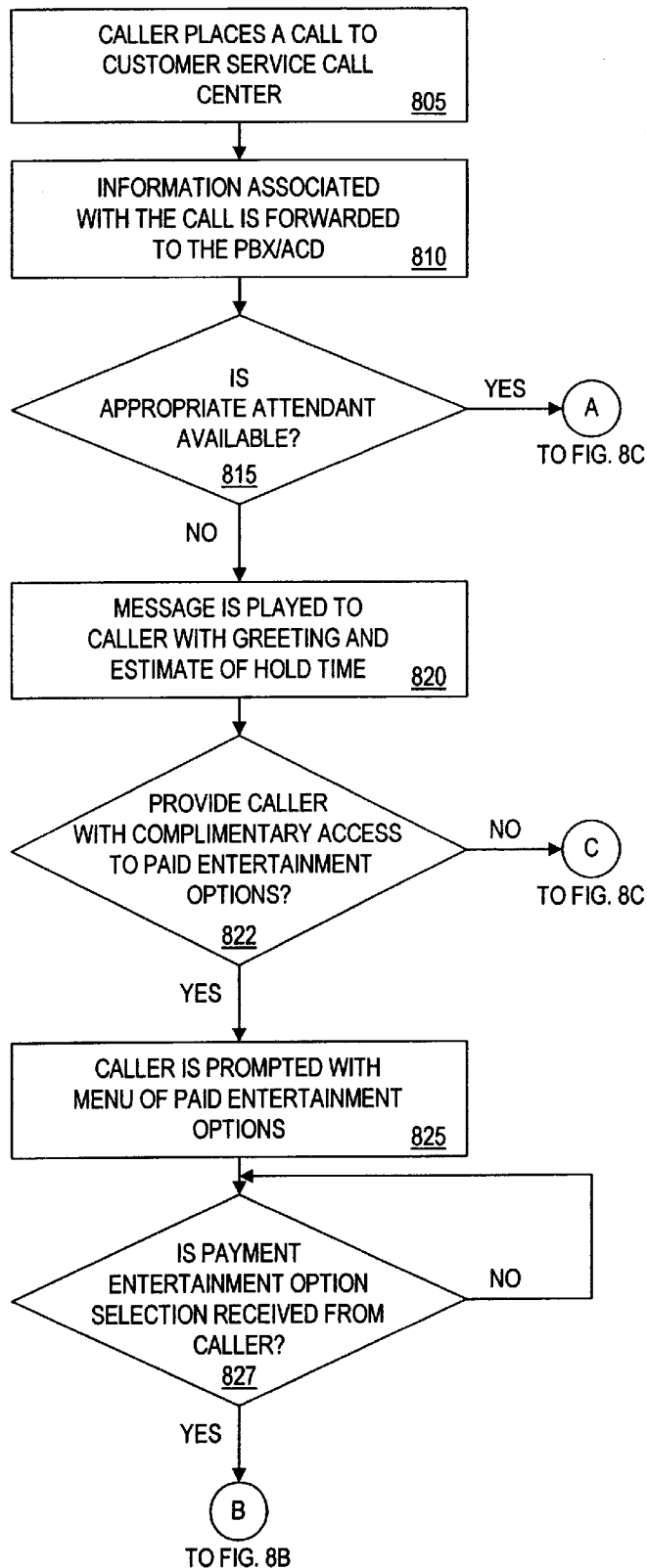
FIGS. 8a through 8c, collectively, are a flow chart describing an exemplary call handing process implemented by the PBX/ACD of FIG. 2.
Figure 8B:
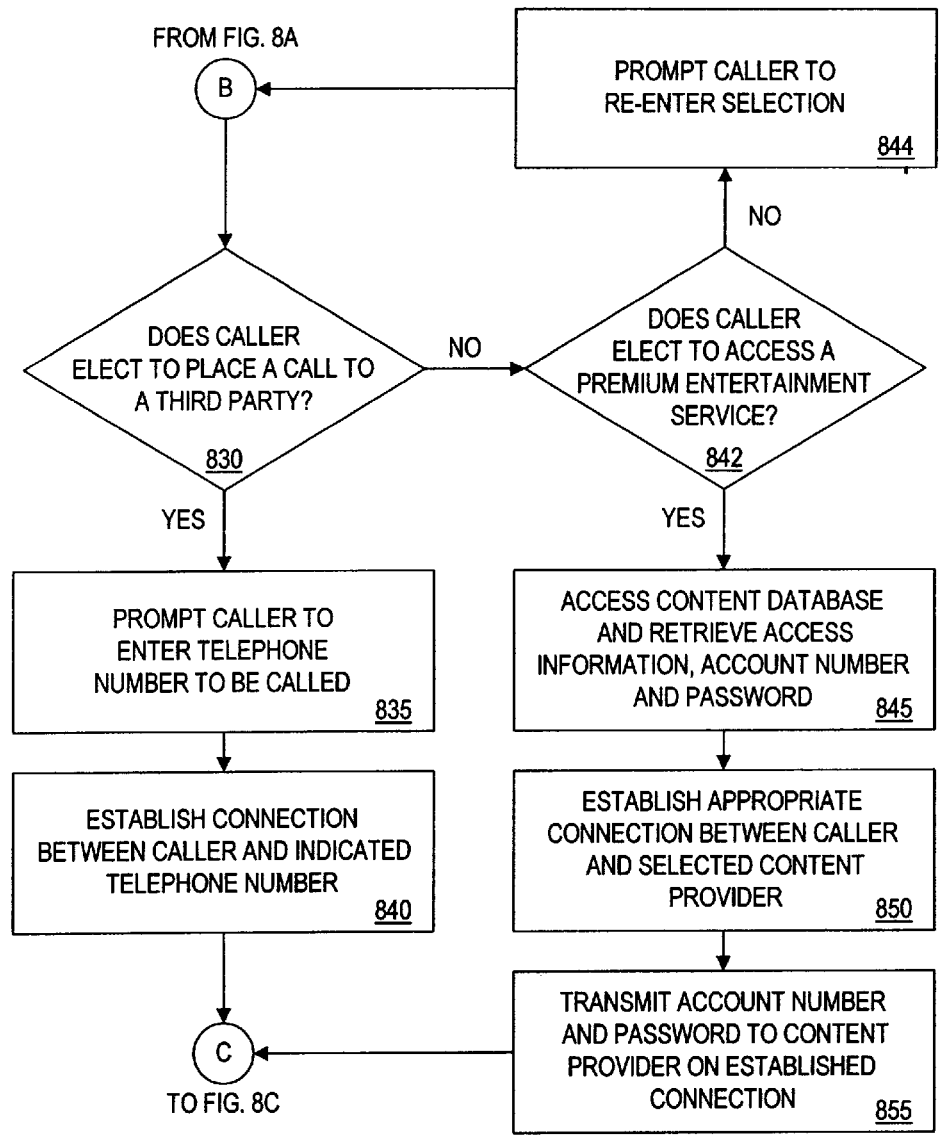
Figure 8C:
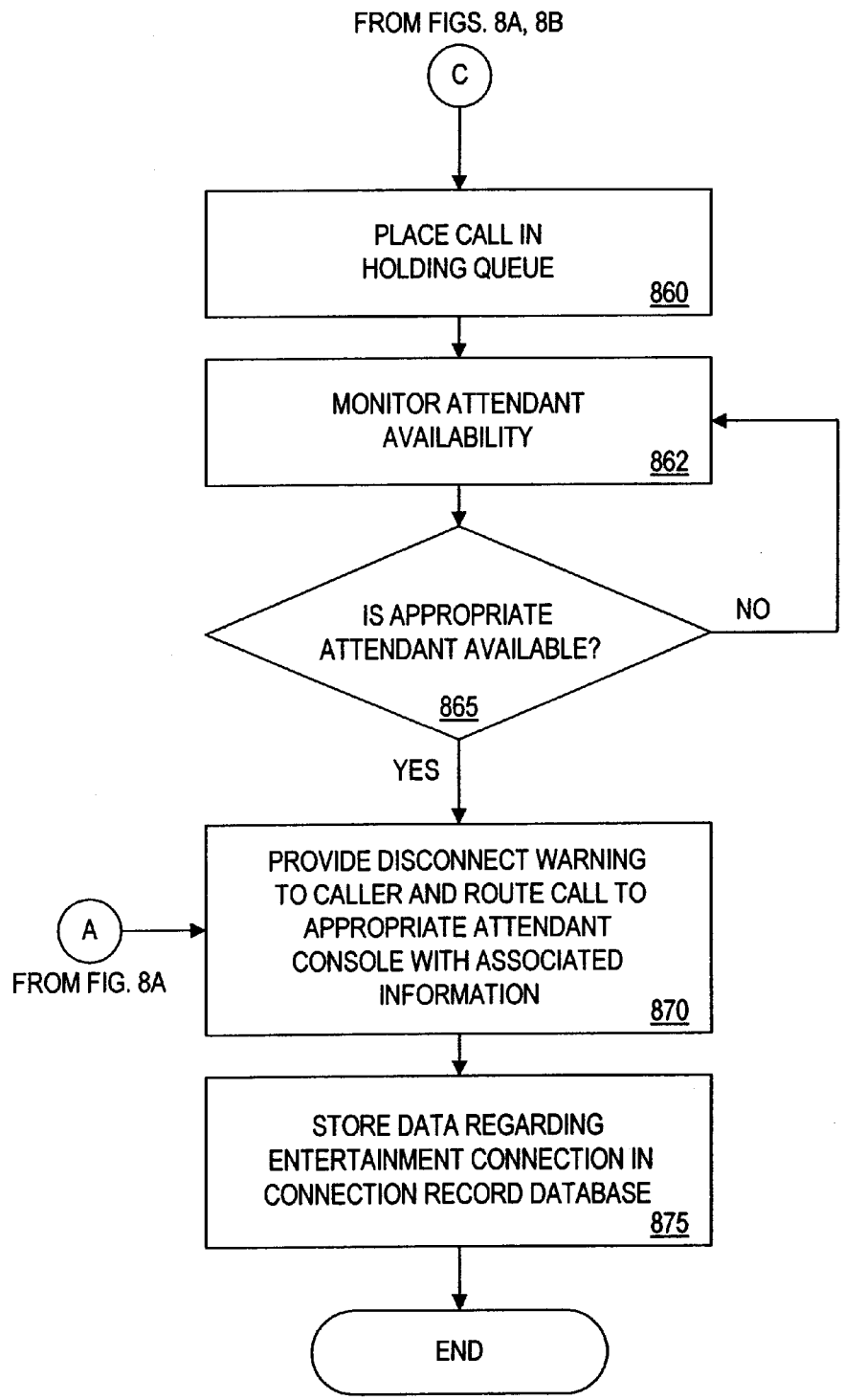

As discussed above, the PBX/ACD 150 preferably executes a call handling process 800, shown in FIGS. 8a through 8c, in order to (i) route a call to an appropriate attendant console 160 within a pool of attendants, (ii) transfer calls to the IVRU 155 when no attendants are available to service a particular call, (iii) place a call in a holding queue, if needed, and (iv) provide a caller on hold with access to the entertainment options.

As illustrated in FIG. 8a, the PBX/ACD 150 begins the processes embodying the principles of the present invention during step 805, when a caller places a call to the customer service call center 100. The information associated with the call is preferably forwarded to the PBX/ACD 150 during step 810. For example, the PBX/ACD 150 may access a database, such as the customer account database 300, to retrieve biographical information on the customer placing the call and receive information initially collected by the IVRU 155.

A test is preferably performed during step 815 to determine if an appropriate attendant is available to handle the call. If it is determined during step 815 that an appropriate attendant is available to handle the call, then program control proceeds to step 870 (FIG. 8c), as discussed below, for call handling. If, however, it is determined during step 815 that an appropriate attendant is not available to handle the call, then a message is preferably played to the caller by the IVRU 155 during step 820 with an appropriate greeting and estimate of the hold time.

A test is performed during step 822 to determine if the caller should be provided with complimentary access to the paid entertainment options. As previously indicated, the customer account database 300 includes a flag in field 340 indicating whether the respective customer should be provided with access to the paid entertainment options during any holding periods. In this manner, complimentary access can be limited to certain classes of customers and denied to customers who have previously made fraudulent usage of the complimentary paid entertainment options. If it is determined during step 822 that the caller should be denied complimentary access to the paid entertainment options, then program control proceeds to step 860 (FIG. 8c) where the caller will be placed in the holding queue.

If, however, it is determined during step 822 that the caller should be provided with complimentary access to the paid entertainment options, then the caller is preferably presented with a menu of the available paid entertainment options by the IVRU 155 during step 825.

In a preferred embodiment, the entertainment option permits the caller to (i) place a free or subsidized call to a third party while on hold; or (ii) to access one or more premium entertainment services while on hold. In one embodiment, the entertainment options offered to the caller correspond to the anticipated holding period. The PBX/ACD 150 preferably waits until a selection of the desired entertainment option is received from the caller during step 827.

Upon receipt of the desired entertainment option, the PBX/ACD 150 performs a test during step 830 (FIG. 8b) to determine if the caller has elected to place a call to a third party. If it is determined during step 830 that the caller has selected to place a call to a third party, then the caller is prompted during step 835 by the IVRU 155 to enter the telephone number of the third party to be called. Thereafter, the PBX/ACD 150 establishes a connection between the caller and the indicated telephone number during step 840 and program control proceeds to step 860 (FIG. 8c).

If, however, it is determined during step 830 that the caller has not elected to place a call to a third party, then a further test is performed during step 842 to determine if the caller has elected to access a premium entertainment service. If it is determined during step 842 that the caller has not elected to access a premium entertainment service, then the selection provided by the caller is not a valid selection and the caller is preferably prompted to re-enter his selection during step 844.

If, however, it is determined during step 842 that the caller has elected to access a premium entertainment service, then the content database 600 is preferably accessed during step 845 to retrieve any access information, account number, and/or password which is required to access the selected premium entertainment service, including the appropriate external network to be utilized; any required network address (Internet), telephone number (shared revenue telephone services) or cable channel (pay-per-view); and any required account number and/or password. For example, if the player has selected a web site-based premium entertainment service provided by content provider 130, which is accessed via the Internet 145, the PBX/ACD 150 accesses the appropriate record of the content database 600 and retrieves the appropriate stored access information, including the URL address associated with the web site.

Thereafter, during step 850, the PBX/ACD 150 utilizes the information retrieved during the previous step to establish the appropriate connection between the caller and the selected content provider, such as content provider 130. For example, if the caller has selected a web site-based premium entertainment service provided by content provider 130, which is accessed via the Internet network 145, the PBX/ACD 150 preferably enters the URL in a web browser, such as Netscape Navigator, to access the desired web site.

Once the connection is established to the selected content provider during step 850, such as the web-based content provider 130, the account number and password retrieved during step 845 are preferably transmitted to the content provider 130 during step 855. Thereafter, program control proceeds to step 860 (FIG. 8c).

The call is placed in the holding queue during step 860 and the PBX/ACD 150 preferably monitors the availability of the attendants during step 862 to determine when an attendant is available. Thus, a test is performed during step 865 to determine if an appropriate attendant is available. If it is determined during step 865 that an appropriate attendant is not available, then program control returns to step 862 where the PBX/ACD 150 continues monitoring the availability of the attendants until an attendant is available. If, however, it is determined during step 865 that an appropriate attendant is available, then a disconnect warning is provided to the caller which permits the caller to choose when to have the call routed to an appropriate attendant console 160 during step 870, together with any associated collected information, in the manner described above. In one embodiment, the caller can elect to continue accessing the entertainment option beyond the complimentary time offered by the call center 100 by providing a payment.

Finally, the PBX/ACD 150 preferably creates a record of the entertainment option connection in the connection record database 700 during step 875. As previously indicated, this record may be utilized to confirm any billing information received from the content provider 130. Thereafter, the PBX/ACD 150 exits the process.

The PBX/ACD 150 is preferably billed by each content or service provider for the total connection time for each caller. The billing information can be verified using the connection record database 600.

It is to be understood that the embodiments and variations shown and described herein are merely illustrative of the principles of this invention and that various modifications may be implemented by those skilled in the art without departing from the scope and spirit of the invention.

We claim:

1. A method of entertaining a caller placed in a queue, said method comprising the steps of:

receiving an incoming telephone call from said caller;

placing said call in said queue;

offering said caller a plurality of entertainment options;

receiving from said caller a selection of an entertainment option; and establishing a connection between said caller and said selected entertainment option while said call is in said queue;

wherein said entertainment options permit the caller to (i) place a call to a third party while on hold; or (ii) access one or more premium entertainment services.

2. The method according to claim 1, further comprising the step of forwarding said call to an attendant when said attendant is available.

3. A method of entertaining a caller placed in a queue, said method comprising the steps of:

receiving an incoming telephone call from said caller;

placing said call in said queue;

offering said caller a plurality of entertainment options;

receiving from said caller a selection of an entertainment option;

establishing a connection between said caller and said selected entertainment option while said call is in said queue;

receiving a payment from said caller for said entertainment option; and maintaining said connection to said entertainment option after an attendant becomes available by providing an additional payment.

4. A method of entertaining a caller placed in a queue, said method comprising the steps of:

receiving an incoming telephone call from said caller;

placing said call in said queue;

offering said caller a plurality of entertainment options;

receiving from said caller a selection of an entertainment option; and establishing a connection between said caller and said selected entertainment option while said call is in said queue;

wherein said step of offering said caller a plurality of entertainment options is provided only to certain classes of callers.

5. A method of entertaining a caller placed in a queue, said method comprising the steps of:

receiving an incoming telephone call from said caller;

placing said call in said queue;

offering said caller a plurality of entertainment options;

receiving from said caller a selection of an entertainment option; and establishing a connection between said caller and said selected entertainment option while said call is in said queue;

wherein said step of offering said caller a plurality of entertainment options is denied to a caller if said caller has previously made fraudulent usage of said entertainment options.

6. A method of entertaining a caller placed in a queue by a call center, said method comprising the steps of:

receiving an incoming telephone call from said caller;

placing said call in said queue;

offering said caller an option to place a call to a called party while said call is in said queue;

receiving from said caller a telephone number identifying said called party;

establishing a telephone connection between said caller and said called party while said call is in said queue;

receiving a payment from said caller for said telephone connection to said called party; and maintaining said connection to said called party after an attendant becomes available by providing an additional payment.

7. A method of entertaining a caller placed in a queue by a call center, said method comprising the steps of:

receiving an incoming telephone call from said caller;

placing said call in said queue;

offering said caller an option to place a call to a called party while said call is in said queue;

receiving from said caller a telephone number identifying said called party; and establishing a telephone connection between said caller and said called party while said call is in said queue;

wherein said step of offering said caller an option is denied to a caller if said caller has previously made fraudulent usage of said calls to a called party.

8. A system for entertaining a caller placed in a queue, said system comprising:

a communications port for receiving an incoming telephone call from said caller; means for placing said call in said queue;

means for offering said caller an option to place a call to a called party while said call is in said queue;

means for receiving a telephone number from said caller identifying said called party;

a telephone switch for establishing a telephone connection between said caller and said called party;

means for receiving a payment from said caller for said telephone connection to said called party; and means for said caller to maintain said connection to said called party after an attendant becomes available by providing an additional payment.

9. A method of entertaining a caller placed in a queue, said method comprising the steps of:

receiving an incoming telephone call from said caller;

placing said call in said queue;

offering said caller an option to access one or more premium entertainment services while said call is in said queue;

providing a connection between said caller and a selected one of said premium entertainment services while said call is in said queue; and receiving a payment from said caller for said access to said premium entertainment service.

10. The method according to claim 9, further comprising the step of forwarding said call to an attendant when said attendant is available.

11. The method according to claim 9, further comprising the step of announcing an anticipated amount of time said call will be in said queue.

12. A method of entertaining a caller placed in a queue, said method comprising the steps of:

receiving an incoming telephone call from said caller;

placing said call in said queue;

offering said caller an option to access one or more premium entertainment services while said call is in said queue; and providing a connection between said caller and a selected one of said premium entertainment services while said call is in said queue;

wherein said premium entertainment service is a web site.

13. A method of entertaining a caller placed in a queue, said method comprising the steps of:

receiving an incoming telephone call from said caller;

placing said call in said queue;

offering said caller an option to access one or more premium entertainment services while said call is in said queue; and providing a connection between said caller and a selected one of said premium entertainment services while said call is in said queue;

wherein said premium entertainment service is a pay-per-view service.

14. A method of entertaining a caller placed in a queue, said method comprising the steps of:

receiving an incoming telephone call from said caller;

placing said call in said queue;

offering said caller an option to access one or more premium entertainment services while said call is in said queue; and providing a connection between said caller and a selected one of said premium entertainment services while said call is in said queue;

wherein said premium entertainment service is a shared-revenue telephone service.

15. A method of entertaining a caller placed in a queue, said method comprising the steps of:

receiving an incoming telephone call from said caller;

placing said call in said queue;

offering said caller an option to access one or more premium entertainment services while said call is in said queue;

providing a connection between said caller and a selected one of said premium entertainment services while said call is in said queue; and maintaining said connection to said premium entertainment service after an attendant becomes available by providing an additional payment.

16. The method according to claim 15, further comprising the step of presenting said caller with a menu of available premium entertainment services and for receiving a selection from said caller of a desired premium entertainment service.

17. A method of entertaining a caller placed in a queue, said method comprising the steps of:

receiving an incoming telephone call from said caller;

placing said call in said queue;

offering said caller an option to access one or more premium entertainment services while said call is in said queue; and providing a connection between said caller and a selected one of said premium entertainment services while said call is in said queue;

wherein said step of offering said caller an option is provided only to certain classes of callers.

18. The method according to claim 17, further comprising the step of offering a selection of said premium entertainment services based upon the anticipated amount of time said call will be in said queue.

19. A method of entertaining a caller placed in a queue, said method comprising the steps of:

receiving an incoming telephone call from said caller;

placing said call in said queue;

offering said caller an option to access one or more premium entertainment services while said call is in said queue; and providing a connection between said caller and a selected one of said premium entertainment services while said call is in said queue;

wherein said step of offering said caller an option is denied to a caller if said caller has previously made fraudulent usage of said premium entertainment services.

20. The method according to claim 19, further comprising the step of storing a record of connections made to each premium entertainment service.

21. A system for entertaining a caller placed in a queue, said system comprising:

a communications port for receiving an incoming telephone call from said caller;

means for placing said call in said queue;

means for offering said caller an option to access a premium entertainment service while said call is in said queue;

means for receiving a selection from said caller identifying a premium entertainment service;

a switch for establishing a connection between said caller and said premium entertainment service; and means for receiving a payment from said caller for said access to said premium entertainment service.

22. The system according to claim 21, further comprising means for announcing an anticipated amount of time said call will be in said queue.

23. The system according to claim 21, further comprising means for selecting said premium entertainment service based upon the anticipated amount of time said call will be in said queue.

24. The system according to claim 21, further comprising means for presenting said caller with a menu of available premium entertainment services and for receiving a selection from said caller of a desired premium entertainment service.

25. The system according to claim 21, further comprising means for storing a record of connections made to each premium entertainment service.

26. The system according to claim 21, further comprising means for said caller to maintain said connection to said premium entertainment service after an attendant becomes available by providing an additional payment.

27. A method of entertaining a caller placed in a queue, said method comprising:

receiving an incoming telephone call from said caller;

placing said call in said queue;

offering said caller a plurality of entertainment options;

receiving from said caller a selection from said plurality of entertainment options; and establishing a connection between said caller and said selected entertainment option while said call is in said queue;

wherein at least one of said plurality of entertainment options permit the caller to access a premium entertainment service.

28. A method of entertaining a caller placed in a queue, comprising:

receiving an incoming telephone call from the caller;

placing the call in the queue;

offering the caller a plurality of premium entertainment options;

receiving from the caller a selected premium entertainment option; and arranging, based on the selected premium entertainment option, a connection between the caller and a premium entertainment service while the call is in the queue.

29. The method of claim 28, wherein said plurality of premium entertainment options comprise an option to receive the premium entertainment service and an option to not receive the premium entertainment service.

30. The method of claim 28, further comprising providing a payment to a provider of the premium entertainment service.

31. A medium storing instructions adapted to be executed by a processor to perform the method of claim 28.

32. A call processing device, comprising:

a processor; and a storage device coupled to said processor and storing instructions adapted to be executed by said processor to perform the method of claim 28.

33. A call processing apparatus, comprising:

means for receiving an incoming telephone call from a caller;

means for placing the call in a queue;

means for offering the caller a plurality of premium entertainment options;

means for receiving from the caller a selected premium entertainment option; and means for arranging, based on the selected premium entertainment option, a connection between the caller and a premium entertainment service while the call is in the queue.

34. A method of entertaining a caller placed in a queue, comprising:

receiving an incoming telephone call from the caller;

placing the call in the queue;

arranging a connection between the caller and a premium entertainment service while the call is in the queue; and arranging for the caller to provide a payment for the premium entertainment service.

35. A medium storing instructions adapted to be executed by a processor to perform the method of claim 34.

36. A call processing device, comprising:

a processor; and a storage device coupled to said processor and storing instructions adapted to be executed by said processor to perform the method of claim 34.

37. A call processing apparatus, comprising:

means for receiving an incoming telephone call from a caller;

means for placing the call in a queue;

means for arranging a connection between the caller and a premium entertainment service while the call is in the queue; and means for arranging for the caller to provide a payment for the premium entertainment service.

38. A method of entertaining a caller placed in a queue, said method comprising:

receiving an incoming telephone call from said caller;

placing said call in said queue;

offering said caller a plurality of entertainment options;

receiving from said caller a selection from said plurality of entertainment options; and establishing a connection between said caller and said selected entertainment option while said call is in said queue;

wherein at least one of said plurality of entertainment options permit the caller to place a call to a third party.

39. A method of entertaining a caller placed in a queue, comprising:

receiving an incoming telephone call from the caller;

placing the call in the queue;

offering the caller a plurality of entertainment options;

receiving from the caller a selected entertainment option; and arranging, based on the selected entertainment option, a connection between the caller and a third party selected by the caller while the call is in the queue.

40. The method of claim 39, wherein said plurality of entertainment options comprise an option to have the connection with the third party and an option to not have the connection with the third party.

41. A medium storing instructions adapted to be executed by a processor to perform the method of claim 39.

42. A call processing device, comprising:

a processor; and a storage device coupled to said processor and storing instructions adapted to be executed by said processor to perform the method of claim 39.

43. A call processing apparatus, comprising:

means for receiving an incoming telephone call from a caller;

means for placing the call in a queue;

means for offering the caller a plurality of entertainment options;

means for receiving from the caller a selected entertainment option; and means for arranging, based on the selected entertainment option, a connection between the caller and a third party selected by the caller while the call is in the queue.

44. A method of entertaining a caller placed in a queue, comprising:

receiving an incoming telephone call from the caller;

placing the call in the queue;

arranging a connection between the caller and a third party selected by the caller while the call is in the queue; and arranging for the caller to provide a payment for the connection.

45. A medium storing instructions adapted to be executed by a processor to perform the method of claim 44.

46. A call processing device, comprising:

a processor; and a storage device coupled to said processor and storing instructions adapted to be executed by said processor to perform the method of claim 44.

47. A call processing apparatus, comprising:

means for receiving an incoming telephone call from a caller;

means for placing the call in a queue;

means for arranging a connection between the caller and a third party selected by the caller while the call is in the queue; and means for arranging for the caller to provide a payment for the connection.

* * * * *